Nov. 6, 1956
W. K. MOENNIG ET AL
2,769,335
MOUNTING OIL WELL CORES
Filed March 20, 1953
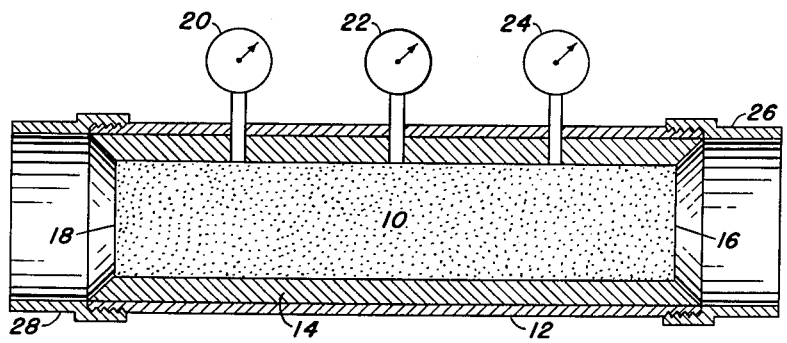
INVENTOR.
WILLIAM K. MOENNIG
BY  ORRIN C. HOLBROOK
ATTORNEY

United States Patent Office 2,769,335
Patented Nov. 6, 1956

2,769,335

MOUNTING OIL WELL CORES

William K. Moennig and Orrin C. Holbrook, Crystal Lake, Ill., assignors to The Pure Oil Company, Chicago, Ill., a corporation of Ohio Application March 20, 1953, Serial No. 343,708

1 Claim. (Cl. 73—38)

This invention relates to the measurement of the characteristics of lithological samples, particularly core samples taken from oil and gas wells. A more specific aspect of this invention relates to a method of mounting lithological samples for the purpose of determining the characteristics thereof.

In the drilling of oil and gas wells, samples of the strata through which the well is being drilled are taken and various characteristics of the samples or cores are determined for the purpose of establishing the lithological character of the structure, estimating the quantity of oil or gas in the formation, the ease of flow of fluids through the strata, etc. Such cores or samples are also taken from producing strata and the characteristics determined for the purpose of estimating reserves, predicting production rates, etc. Among the characteristics of well cores determined for these and other purposes are the porosity and permeability of the sample. In order to measure the characteristics of a lithological sample or core, these samples or cores are usually mounted within a suitable casing or container. The mounting of such core samples is a rather tedious and exacting procedure, particularly where fluids are to be passed through the sample in order to measure the characteristics thereof. One of the major problems in mounting lithological samples in order to determine porosity and other fluid flow characteristics is the difficulty of obtaining a tight seal around the outer surface of the sample. If a tight seal is not obtained, the fluid being passed through the sample will by-pass the core and flow between the core sample and casing. In an ideal situation, the passage of fluid should be restricted to passage through the core itself.

Various methods of mounting well cores or samples have heretofore been suggested and have been employed in commercial practice. Such procedures include mounting in preformed plastic casings, mounting in plastics, such as Bakelite, Lucite, etc., by pressure molding and mounting in impervious, resilient sleeves, such as rubber, etc., held in place by the application of pressure by an outside container. In the first of these methods, a sample to be mounted must usually be of uniform shape and size and the preformed plastic casing must be accurately machined in order to form a tight-fitting casing about the sample. However, even though accurate machining is attained and a fairly tight fit of the core within the casing is attained, large amounts of fluid to be passed through the core will pass between the core and the outer casing. In the prior art methods of mounting in a plastic material by pressure molding, the disadvantages are obvious. Although a comparatively tight seal may be obtained by this method, the method itself is time-consuming and laborious and requires the use of pressure molding equipment. In those cases in which a resilient sleeve is held in place about the core by applying pressure from an outer source, some by-passing of fluid between the core sample and the resilient sleeve takes place regardless of the amount of pressure applied. In addition, this method is not adaptable to the mounting of large or irregularly shaped samples, the size and shape of the sample ordinarily being limited by the size and shape of the sleeve and the pressure applying outer casing.

It is, therefore, an object of this invention to provide an improved method of mounting lithological samples.

Another object of this invention is to provide a simple and effective method for mounting lithological samples of a wide variety of shapes and sizes.

Still another object of this invention is to provide a method of mounting lithological samples which method is simple to carry out and in which the sample may be readily recovered for future use.

Another and further object of this invention is to provide a method of mounting lithological samples whereby a tight seal between the mounting and the core is obtained, thus preventing liquids which are being passed through the sample from passing between the sample and its mounting.

Further objects and advantages of this invention will be apparent from the following description of the invention:

In accordance with this invention, lithological samples are readily mounted in a suitable container or casing by placing the sample within the container or casing and introducing molten metal which expands slightly upon solidification between the sample and the container or casing. The metal employed in the practice of the present invention is preferably one having a low melting point. By employing a metal having a low melting point, the metal may be readily reduced to its molten state and, after the desired tests of the sample's characteristics have been made, the sample may be recovered by simply heating the container and core. A typical alloy which has been employed in the mounting of a variety of well cores has the following composition:

| | Percent |
|---|---|
| Bismuth | 50.0 |
| Lead | 26.7 |
| Tin | 13.3 |
| Cadmium | 10.0 |

The alloy described above has a melting point of about 158° F. and expands slightly upon solidification. In the cases in which this alloy was employed in mounting a well core, the core was readily recovered from its mounting by simply running boiling water over the mounted core. In this manner, substantially all of the alloy was also recovered and was used in further work. In the practice of the present invention, eutectic fusible alloys containing at least 40 percent bismuth are preferred. Examples of other alloys suitable for use in the practice of the present invention are listed in the table below, wherein the approximate compositions and melting points of such alloys are set forth:

Table I

| Alloy | Percent Bi | Percent Pb | Percent Sn | Percent Cd | Melting Point, °F. |
|---|---|---|---|---|---|
| A | 50 | 27 | 13 | 10 | 158-165 |
| B | 54 | | 26 | 20 | 232 |
| C | 53 | 32 | 15 | | 205 |
| D | 52 | 40 | | 8 | 197 |
| E | 40 | 40 | 11 | 9 | 165-190 |

In contrast to metals or alloys which expand slightly upon solidification, other metals, such as lead, have been used. However, metals such as lead were found to contract slightly upon solidification, thereby permitting testing fluids to pass between the core and the mounting.

The operation of the method of this invention will be more clearly explained by reference to the drawing wherein the figure represents the cross-sectional view of a lithological sample mounted in accordance with the method of this invention.

In accordance with a preferred embodiment of this invention, a lithological sample 10 is placed within an outer casing 12, the inner dimensions of said casing being larger than the outer dimensions of the sample. Casing 12 may be any suitable outer casing, such as a metal pipe, a plastic casing, etc. It is preferred that sample 10 and casing 12 be preheated to a temperature slightly higher than the melting point of the metal to be employed in mounting the sample, although such preheating is not necessary. Having preheated sample 10 and casing 12, a metal which expands slightly upon solidification, such as the alloy described above, is melted and introduced between sample 10 and casing 12 to form an annular seal 14 upon solidification. Any metal which may have solidified upon the ends of sample 10 may be removed therefrom by the local application of heat or by machining in order to expose ends 16 and 18 of sample 10. It is also contemplated to simultaneously measure temperatures and pressures within the well core while carrying out other tests on the core, such as the passage of a fluid therethrough. In order to make such temperature or pressure measurements, holes may be drilled through casing 12 and sealing medium 14 to a point within sample 10. Suitable instruments for measuring pressure and temperature, such as indicators 20, 22, and 24, may be inserted in the holes thus drilled. In order to pass a fluid through sample 10, suitable connecting elements, such as pipe connectors 26 and 28, may be attached to casing 12. These coupling elements may be any suitable type of coupling element which will permit connection of tubing or hose to the ends of casing 12, thereby permitting the passage of fluid through sample 10. In carrying out certain measurements, such as the measurement of permeability, porous discs or compacted sand (not shown), held in place by suitable pressuring means, such as an ordinary C clamp, may be placed against ends 16 and 18 of sample 10. After the desired measurements of the characteristics of sample 10 have been completed, sample 10 may be readily recovered from its mounting by merely heating the mounting assembly or running boiling water over the assembly. In this manner, substantially all of sealing medium may be recovered for reuse and sample 10 may be preserved for further tests.

Having thus described our invention, we claim:

In a method for determining the fluid flow characteristics of a lithological sample the improvement comprising positioning said sample within a tubular member, introducing a low melting alloy in molten form into the void between said sample and said tubular member, said alloy consisting of 50 percent bismuth, 26.7 percent lead, 13.3 percent tin and 10 percent cadmium and having the characteristic of expanding on solidification, cooling said molten alloy to solidify same, and passing fluid through said sample to measure the fluid flow characteristics thereof.

References Cited in the file of this patent

UNITED STATES PATENTS

| | | |
|---|---|---|
| 2,293,488 | Bays | Aug. 18, 1942 |
| 2,508,488 | Bouton et al. | May 23, 1950 |
| 2,615,074 | Bronovicki | Oct. 21, 1952 |
| 2,662,401 | Bailly | Dec. 15, 1953 |

OTHER REFERENCES

Mechanical Engineers Handbook, Marks 1941, p. 664.

Metals Handbook, 1948, pub. by American Society for Metals, pp. 744–745.

Cerro Alloys, Known Uses, Applications, 4 pp. Cerro De Pasco Copper Corp., New York, 1948.